(12) United States Patent
Lee et al.

(10) Patent No.: US 12,049,410 B2
(45) Date of Patent: Jul. 30, 2024

(54) ADSORPTION DESALINATION SYSTEM USING MULTI-EFFECT EVAPORATION APPARATUS

(71) Applicant: KOREA INSTITUTE OF OCEAN SCIENCE & TECHNOLOGY, Busan (KR)

(72) Inventors: Ho Saeng Lee, Sokcho-si (KR); Ho Ji, Gangwon-do (KR); Seung Taek Lim, Sokcho-si (KR); Deok Soo Moon, Sokcho-si (KR); Young Deuk Kim, Ansan-si (KR); Seong Yong Woo, Gwangmyeong-si (KR); Jun Sik Kim, Gimpo-si (KR); Kyung Hun Kim, Ansan-si (KR)

(73) Assignee: Korea Institute of Ocean Science & Technology, Busan (KR)

(*) Notice: Subject to any disclaimer, the term of this patent is extended or adjusted under 35 U.S.C. 154(b) by 218 days.

(21) Appl. No.: 17/673,649

(22) Filed: Feb. 16, 2022

(65) Prior Publication Data

US 2022/0169535 A1    Jun. 2, 2022

Related U.S. Application Data

(63) Continuation of application No. PCT/KR2020/009872, filed on Jul. 27, 2020.

(30) Foreign Application Priority Data

Aug. 20, 2019   (KR) .................. 10-2019-0101687

(51) Int. Cl.
*C02F 1/04*       (2023.01)
*B01D 1/16*       (2006.01)
(Continued)

(52) U.S. Cl.
CPC ................ *C02F 1/048* (2013.01); *B01D 1/16* (2013.01); *B01D 1/26* (2013.01); *B01D 1/305* (2013.01);
(Continued)

(58) Field of Classification Search
CPC ........ C02F 1/048; C02F 1/28; C02F 2103/08; B01D 1/16; B01D 1/26; B01D 1/305
See application file for complete search history.

(56) References Cited

U.S. PATENT DOCUMENTS

| 3,261,766 A | * | 7/1966 | Sherwood | ................. C02F 1/16 159/17.3 |
| 3,288,686 A | * | 11/1966 | Othmer | ..................... C02F 1/04 203/88 |
| 4,379,734 A | * | 4/1983 | Franzen | ................. B01D 1/285 159/24.2 |

(Continued)

FOREIGN PATENT DOCUMENTS

| JP | 6289413 B | 3/2018 |
| KR | 10-2007-0118107 A | 12/2007 |

(Continued)

OTHER PUBLICATIONS

International Search Report and Written Opinion dated Dec. 18, 2020 in International Application No. PCT/KR2020/009872.

*Primary Examiner* — Jonathan Miller
(74) *Attorney, Agent, or Firm* — Knobbe, Martens, Olson & Bear, LLP

(57) ABSTRACT

This application relates to an adsorption desalination system using a multi-effect evaporator apparatus. In one aspect, the system includes a multi-effect evaporator apparatus producing high-pressure vapor and low-pressure vapor, a plurality of reaction units including an adsorbent adsorbing or desorbing moisture from the high-pressure vapor and low-pressure vapor and a heat exchange tube transferring heat to the adsorbent. The system may also include a condenser condensing vapor containing moisture desorbed from the (Continued)

adsorbents, and cold-hot water lines selectively supplying chilled water and hot water to the heat exchange tubes. The system may further include vapor lines connecting the multi-effect evaporator apparatus and the reaction units, and the reaction units and the condenser, respectively, valves disposed in the vapor lines, and a valve controller controlling operation of the valves to selectively supply chilled water or hot water supplied to the heat exchange tubes from the cold-hot water lines.

4 Claims, 12 Drawing Sheets

(51) Int. Cl.
  *B01D 1/26* (2006.01)
  *B01D 1/30* (2006.01)
  *C02F 1/28* (2023.01)
  *C02F 103/08* (2006.01)

(52) U.S. Cl.
  CPC ............ *C02F 1/28* (2013.01); *C02F 2103/08* (2013.01); *C02F 2201/005* (2013.01); *C02F 2209/40* (2013.01)

(56) References Cited

U.S. PATENT DOCUMENTS

| | | | | |
|---|---|---|---|---|
| 4,403,480 | A * | 9/1983 | Franzen | F25B 27/02 62/476 |
| 8,535,486 | B2 * | 9/2013 | Ng | B01D 5/0033 62/480 |
| 8,603,223 | B2 * | 12/2013 | Saha | C02F 1/04 62/480 |
| 9,028,653 | B2 * | 5/2015 | Kwak | B01D 1/26 202/195 |
| 9,091,469 | B2 * | 7/2015 | Xiang | C02F 1/048 |
| 10,150,681 | B2 * | 12/2018 | Yuh | F24S 23/77 |
| 10,773,182 | B2 * | 9/2020 | Ling | B01D 1/0082 |
| 2008/0034785 | A1 * | 2/2008 | Yanagi | F25B 17/083 62/109 |
| 2008/0164136 | A1 * | 7/2008 | Ophir | B01D 1/04 202/167 |
| 2012/0119396 | A1 * | 5/2012 | Saha | C02F 1/04 261/148 |
| 2013/0270100 | A1 * | 10/2013 | Kwak | B01D 1/26 202/174 |
| 2013/0341177 | A1 * | 12/2013 | Ng | C02F 1/043 203/41 |
| 2017/0072336 | A1 * | 3/2017 | Ng | B01D 53/0462 |
| 2018/0002193 | A1 * | 1/2018 | Yuh | C02F 1/048 |

FOREIGN PATENT DOCUMENTS

| | | |
|---|---|---|
| KR | 10-1186167 B1 | 10/2012 |
| KR | 10-1258433 B1 | 4/2013 |
| KR | 10-1556915 B1 | 9/2015 |
| KR | 10-1834881 B1 | 4/2018 |

* cited by examiner

Figure 2

| BED | BED A[1] | BED B[2] |
|---|---|---|
| CYCLE#1 | ADSORPTION PROCESS | DESOPRTION PROCESS |
| | EVAPORATOR CONNECTED (GV-02 OPENED & GV-04 CLOSED) | CONDENSER CONNECTED (GV-02 CLOSED, GV-03 OPENED) |
| | CHILLED WATER SUPPLIED (AV-06 & AV-08 OPENED) | HOT WATER SUPPLIED (AV-01 & AV-03 OPENED) |
| SWITCH#1 | PREHEATING PROCESS | PRECOOLING PROCESS |
| | BED CLOSED (GV-02 & GV-04 CLOSED) | BED CLOSED (GV-01 & GV-03 CLOSED) |
| | HOT WATER SUPPLIED (AV-05 & AV-07 OPENED) | CHILLED WATER SUPPLIED (AV-02 & AV-04 OPENED) |
| CYCLE #2 | DESOPRTION PROCESS | ADSORPTION PROCESS |
| | CONDENSER CONNECTED (GV-02 CLOSED & GV-04 OPENED) | EVAPORATOR CONNECTED (GV-01 OPENED, GV-0C CLOSED) |
| | HOT WATER SUPPLIED (AV-05 & AV-07 OPENED) | CHILLED WATER SUPPLIED (AV-02 & AV-04 OPENED) |
| SWITCH#2 | PRECOOLING PROCESS | PREHEATING PROCESS |
| | BED CLOSED (GV-02 & GV-04 CLOSED) | BED CLOSED (GV-01 & GV-03 CLOSED) |
| | CHILLED WATER SUPPLIED (AV-06 & AV-08 OPENED) | HOT WATER SUPPLIED (AV-01 & AV-03 OPENED) |

Figure 4

| BED | BED A | BED B | BED C |
|---|---|---|---|
| CYCLE#1 | LOW-PRESSURE ADSORPTION PROCESS | HIGH-PRESSURE ADSORPTION PROCESS | DESOPRTION PROCESS |
| | LOW-PRESSURE EVAPORATOR CONNECTED (GV-02 OPENED & GV-07 CLOSED) | HIGH-PRESSURE EVAPORATOR CONNECTED (GV-03 OPENED & GV-08 CLOSED) | CONDENSER CONNECTED (GV-05 & GV-06 CLOSED & GV-09 OPENED) |
| | CHILLED WATER SUPPLIED (AV-02 & AV-04 OPENED) | CHILLED WATER SUPPLIED (AV-06 & AV-08 OPENED) | HOT WATER SUPPLIED (AV-09 & AV-11 OPENED) |
| SWITCH#1 | LOW-PRESSURE ADSORPTION PROCESS | PREHEATING PROCESS | PRECOOLING PROCESS |
| | LOW-PRESSURE EVAPORATOR CONNECTED (GV-02 OPENED & GV-07 CLOSED) | BED CLOSED (GV-03 & GV-04 & GV-08 CLOSED) | BED CLOSED (GV-05 & GV-06 & GV-09 CLOSED) |
| | CHILLED WATER SUPPLIED (AV-02 & AV-04 OPENED) | HOT WATER SUPPLIED (AV-05 & AV-07 OPENED) | CHILLED WATER SUPPLIED (AV-10 & AV-12 OPENED) |
| CYCLE#2 | HIGH-PRESSURE ADSORPTION PROCESS | DESOPRTION PROCESS | LOW-PRESSURE ADSORPTION PROCESS |
| | HIGH-PRESSURE EVAPORATOR CONNECTED (GV-01 OPENED & GV-07 CLOSED) | CONDENSER CONNECTED (GV-03 & GV-04 CLOSED & GV-08 OPENED) | LOW-PRESSURE EVAPORATOR CONNECTED (GV-06 OPENED & GV-09 CLOSED) |
| | CHILLED WATER SUPPLIED (AV-02 & AV-04 OPENED) | HOT WATER SUPPLIED (AV-05 & AV-07 OPENED) | CHILLED WATER SUPPLIED (AV-10 & AV-12 OPENED) |
| SWITCH#2 | PREHEATING PROCESS | PRECOOLING PROCESS | LOW-PRESSURE ADSORPTION PROCESS |
| | BED CLOSED (GV-01 & GV-02 & GV-07 CLOSED) | BED CLOSED (GV-03 & GV-04 & GV-08 CLOSED) | LOW-PRESSURE EVAPORATOR CONNECTED (GV-06 OPENED & GV-09 CLOSED) |
| | HOT WATER SUPPLIED (AV-01 & AV-03 OPENED) | CHILLED WATER SUPPLIED (AV-06 & AV-08 OPENED) | CHILLED WATER SUPPLIED (AV-10 & AV-12 OPENED) |
| CYCLE#3 | DESOPRTION PROCESS | LOW-PRESSURE ADSORPTION PROCESS | HIGH-PRESSURE ADSORPTION PROCESS |
| | CONDENSER CONNECTED (GV-01 & GV-02 CLOSED & GV-7 OPENED) | LOW-PRESSURE EVAPORATOR CONNECTED (GV-04 OPENED & GV-08 CLOSED) | HIGH-PRESSURE EVAPORATOR CONNECTED (GV-05 OPENED & GV-09 CLOSED) |
| | HOT WATER SUPPLIED (AV-01 & AV-03 OPENED) | CHILLED WATER SUPPLIED (AV-06 & AV-08 OPENED) | CHILLED WATER SUPPLIED (AV-10 & AV-12 OPENED) |
| SWITCH#3 | PRECOOLING PROCESS | LOW-PRESSURE ADSORPTION PROCESS | PREHEATING PROCESS |
| | BED CLOSED (GV-01 & GV-02 & GV-07 CLOSED) | LOW-PRESSURE EVAPORATOR CONNECTED (GV-04 OPENED & GV-08 CLOSED) | BED CLOSED (GV-05 & GV-06 & GV-09 CLOSED) |
| | CHILLED WATER SUPPLIED (AV-02 & AV-04 OPENED) | CHILLED WATER SUPPLIED (AV-06 & AV-08 OPENED) | HOT WATER SUPPLIED (AV-09 & AV-11 OPENED) |

ADSORPTION DESALINATION SYSTEM USING MULTI-EFFECT EVAPORATION APPARATUS

CROSS-REFERENCE TO RELATED APPLICATIONS

This application is a continuation application, and claims the benefit under 35 U.S.C. § 120 and § 365 of PCT Application No. PCT/KR2020/009872 filed on Jul. 27, 2020, which claims priority to Korean Patent Application No. 10-2019-0101687 filed on Aug. 20, 2019, both of which are hereby incorporated by reference.

BACKGROUND

Technical Field

The present disclosure relates to an adsorption desalination system that converts seawater into freshwater and, more particularly, to an adsorption desalination system using a multi-effect evaporator apparatus, the system being able to maximally produce freshwater from seawater and to produce chilled water for district and residential cooling as a by-product.

Description of Related Technology

In general, an adsorption desalination system is a system that separates water from seawater by evaporating and separating moisture from the seawater through an evaporator, adsorbs vapor to the surface of silica gel in an adsorption process, desorbs the vapor from the surface of the silica gel in a desorption process, and then condenses the desorbed vapor into a liquid state by supplying the vapor to a condenser, thereby collecting freshwater.

SUMMARY

In order to solve the problems described above, an objective of the present disclosure is to provide an adsorption desalination system using multi-effect evaporator apparatus, the adsorption desalination system including a multi-effect evaporator, which produces and provides high-pressure vapor and low-pressure vapor through a first evaporation unit and a second evaporation unit that include a plurality of sequential evaporators, and three adsorption and desorption beds, thereby being able to compensate for a coefficient of performance (COP), maximally produce freshwater, and use chilled water, which is produced as a by-product through the first evaporation unit and the second evaporation unit, as water for district cooling and residential cooling.

An adsorption desalination system using a multi-effect evaporator apparatus according to an embodiment of the present disclosure includes: a multi-effect evaporator apparatus that produces high-pressure vapor and low-pressure vapor; a plurality of reaction units including an adsorbent that adsorbs or desorbs moisture from the high-pressure vapor and low-pressure vapor produced by the multi-effect evaporator apparatus, and a heat exchange tube that can transfer heat to the adsorbent through chilled water or hot water; a condenser configured to condense vapor containing moisture desorbed from the adsorbents of the reaction units so that the vapor can be collected as freshwater; cold-hot water lines configured to selectively supply chilled water and hot water to the heat exchange tubes of the reaction units; vapor lines configured to connect the multi-effect evaporator apparatus and the reaction units to each other and the reaction units and the condenser to each other, respectively; valves that are disposed in the vapor lines; and a valve controller configured to control operation of the valves to selectively supply chilled water or hot water that is supplied to the heat exchange tubes from the cold-hot water lines.

The reaction unit may be composed of a bed A, a bed B, and a bed C each including the adsorbent and the heat exchange tube, and the bed A, the bed B, and the bed C may be controlled by the valve controller to be selectively supplied with high-pressure vapor or low-pressure vapor produced by the multi-effect evaporator apparatus, to be selectively supplied with chilled water or hot water through the cold-hot water lines, and to sequentially perform a low-pressure adsorption process, a high-pressure adsorption process, a preheating process, a desorption process, and a precooling process.

When any one of the bed A, the bed B, and the bed C performs the low-pressure adsorption process, another one may perform the high-pressure adsorption process and the other one may perform the desorption process.

The multi-effect evaporator apparatus may include: a first evaporation unit including a plurality of sequential evaporators and a high-pressure evaporator configured to discharge high-pressure vapor; and a second evaporation unit including a plurality of sequential evaporators and a low-temperature evaporator configured to discharge final low-pressure vapor.

The first evaporation unit and the second evaporation unit may be connected to each other, and condensate water produced therein may sequentially move to an evaporator A1 of the first evaporation unit to the low-pressure evaporator of the second evaporation unit, whereby freshwater may be produced.

The evaporator may include: a heat dissipation pipe configured to collect gas; a spray nozzle configured to spray seawater to a surface of the heat dissipation pipe; a demister disposed over the spray nozzle and configured to separate water drops from vapor produced by evaporation of seawater; and a housing configured to accommodate the spray nozzle, the heat dissipation pipe, and the demister.

By providing the present disclosure having the configuration described above, there is an effect that it is possible to supplement a COP and maximize the yield of freshwater, it is possible to use chilled water, which is produced through the multi-effect evaporator apparatus as a by-product, as water for district cooling and residential cooling, and it is possible to additionally use condensate water, which is produced by latent heat exchange between seawater and vapor through multiple effect distillation, as freshwater.

BRIEF DESCRIPTION OF THE DRAWINGS

FIG. 2 is a logic table that is applied to an existing adsorption desalination system.

FIG. 4 is a table showing the detailed processes of the adsorption desalination system using a multi-effect evaporator apparatus according to the present disclosure.

DETAILED DESCRIPTION

An adsorption desalination system requires a chilled water to remove heat that is generated when vapor is adsorbed to silica gel in the adsorption process, and requires hot water to desorb vapor from silica gel in the desorption process.

To this end, according to existing adsorption desalination systems, hot water is supplied using fossil energy, but there is a problem that the operation cost is considerably increased, the system efficiency is deteriorated, and chilled water is separately needed.

Figure 1:
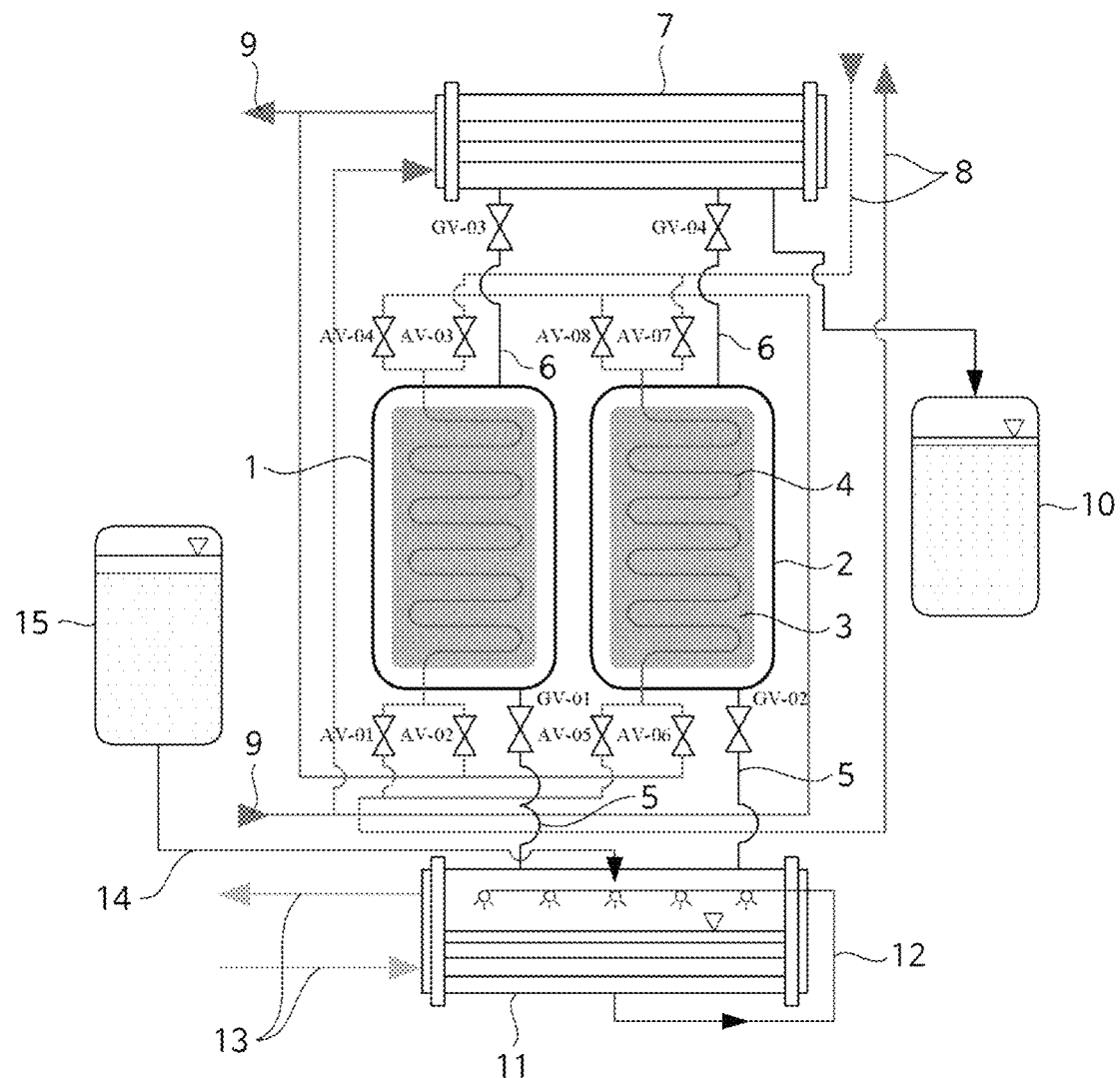
FIG. 1 is a view showing the configuration of an existing adsorption desalination system.

As shown in FIG. 1, according to an AD (adsorption desalination) system of the related art, a heat exchange tube 4 having a hydrophilic adsorbent 3 is mounted in adsorption and desorption beds, and an evaporator and a condenser are connected to the adsorption and desorption beds through vapor lines 5 and 6.

Seawater degassed through a degassing tank 15 is supplied to a falling-film evaporator 11 having a brine distributor through a pipeline 14 and is circulated through a pipeline 12.

The evaporator 11 is connected to an adsorption bed 2, which is used in the adsorption process, by operation of a valve installed in the vapor line 5, and the adsorbent in the adsorption bed 2 adsorbs the vapor separated from the seawater in the evaporator.

In this process, the driving force for adsorbing vapor of the adsorbent comes from physisorption that is based on van der Waals force and small electrostatic force.

Cold water 13 is produced from the evaporator due to latent heat of seawater and may be used for district or residential cooling. The heat generated when the adsorbent adsorbs vapor is removed by chilled water 9 supplied to the heat exchange tube in the adsorption tube.

The desorption bed 1 that is used in the desorption process in addition to the adsorption process described above is connected to the condenser 7 by operation of the valve installed in the vapor line 6, and the vapor adsorbed to the adsorbent is desorbed by hot water 8 that is supplied to the heat exchange tube in the desorption bed.

The desorbed vapor flows to the condenser, which is supplied with chilled water, and condenses therein, and produced freshwater is stored in a storage tank 10. The adsorption and desorption beds 2 and 1 are switched for the desorption process and the adsorption process at a switching time for preheating and precooling, respectively, after a predetermined time (a half cycle), whereby one cycle of the AD system of the related art is completed.

The fundamental operation logic of the AD cycle of the related art described above, as shown in FIG. 2, is repeated in order of cycle #1-switch #1-cycle #2-switch #2.

However, the AD system of the related art described above includes one evaporator and a pair of adsorption and desorption beds and is based on the mass and physical properties of the adsorbent that is used, so it has a defect that the amount and efficiency of producing freshwater are low.

Hereafter, exemplary embodiments are described in detail with reference to the accompanying drawings so that those skilled in the art can easily achieve the present disclosure.

As described above with respect to FIG. 1, an existing adsorption desalination system (hereafter, referred to as an 'AD system') includes an evaporator that produces vapor by evaporating seawater, two reaction units that alternately adsorbs and desorbs vapor, which is transmitted from the evaporator, to and from an adsorbent, cold-hot water lines that selectively supply chilled water and hot air for adsorption and desorption to the reaction units, and a condenser that provides freshwater by condensing vapor desorbed and discharged from the reaction units.

An adsorption desalination system using multi-effect evaporator apparatus according to an embodiment of the present disclosure, as shown in FIGS. 3 to 11, is characterized in that a multi-effect evaporator apparatus 100 that can provide both high-pressure vapor and low-pressure vapor is applied instead of an evaporator in an existing AD system and three or more reaction units 200 are applied.

It is possible to selectively supply high-pressure vapor and low-pressure vapor through the multi-effect evaporator apparatus 100 and it is possible to perform district cooling and residential cooling using multiple effect distillation.

Further, effective equilibrium uptake of an adsorbent and an optimal cycle for a desorption process are achieved by a 2-evaporator and 3-bed AD process, so desalination performance can be improved.

Figure 3:
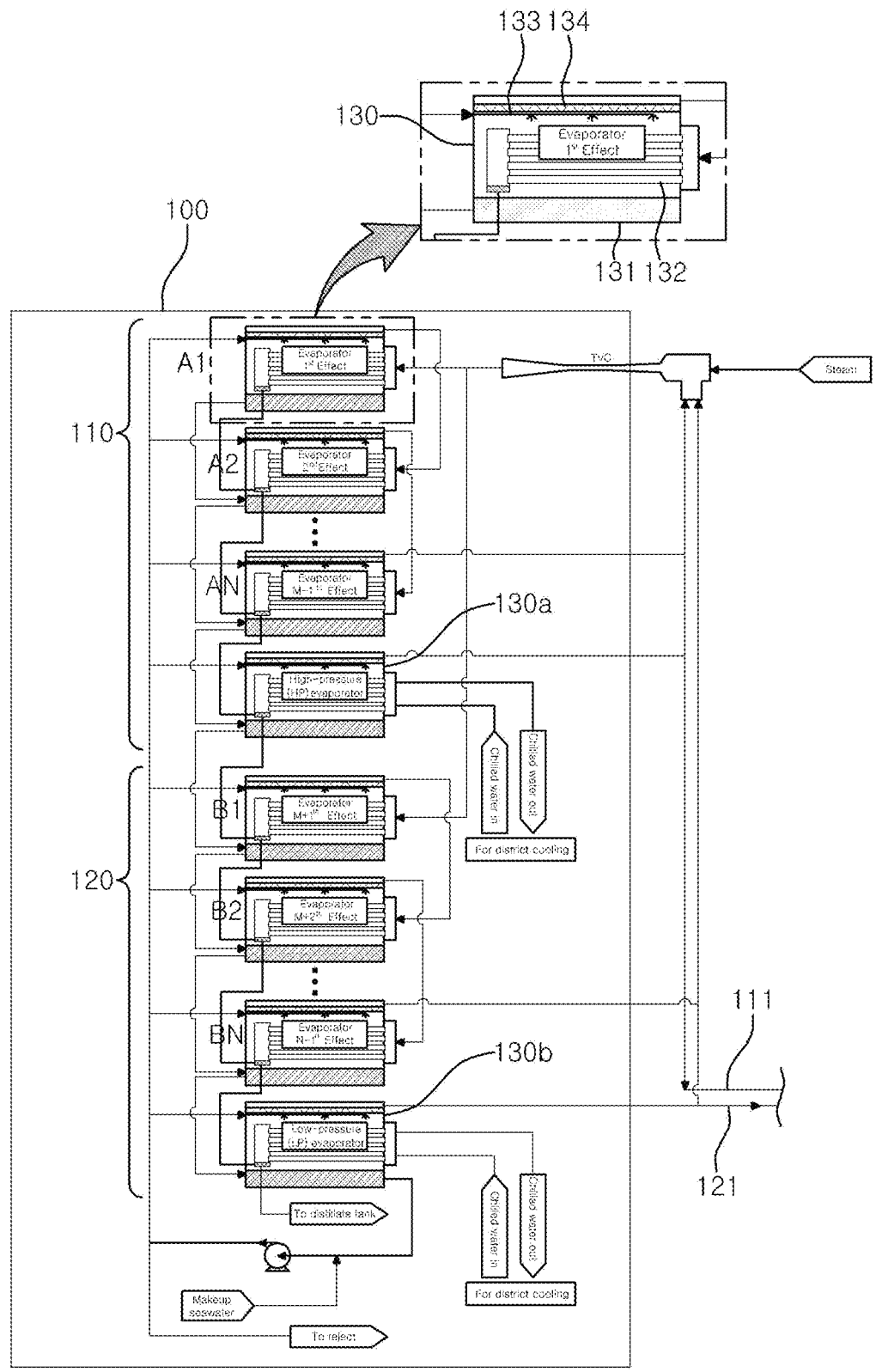
FIG. 3 is a view showing the configuration of an adsorption desalination system using a using multi-effect evaporator apparatus according to the present disclosure.

FIG. 3 is a view showing the configuration of an adsorption desalination system using a using multi-effect evaporator apparatus according to an embodiment of the present disclosure and FIG. 4 shows steps of an adsorption desalination process using a multi-effect evaporator apparatus according to an embodiment of the present disclosure.

The multi-effect evaporator apparatus 100 may include a first evaporation unit 110 and a second evaporation unit 120 that each have several evaporators 130. The first evaporation unit 110 and the second evaporation unit 120 can produce high-pressure vapor and low-pressure vapor, respectively, by evaporating seawater that is supplied.

Hereafter, multi-effect evaporator apparatus 100 is described in more detail.

Referring to FIG. 3, the multi-effect evaporator apparatus 100, as described above, includes a first evaporation unit 110 and a second evaporation unit 120 that each have several evaporators.

The vapor that is produced by the first evaporation unit 110 may be vapor having higher temperature and pressure than the vapor that is produced by the second evaporation unit 120.

As shown in FIG. 3, the first evaporation unit 110 may include sequential evaporators A1 to AN, including a high-pressure evaporator 130*a*, and can discharge high-temperature and high-pressure vapor. The second evaporation unit 120 may include sequential evaporators B1 to BN, including a low-pressure evaporator 130*b*, and can discharge vapor at low temperature and low pressure in comparison to the evaporators A1 to AN of the first evaporation unit 110.

The first evaporation unit 110 and the second evaporation unit 120 may be connected to each other.

The first evaporation unit 110 produces high-pressure vapor using multiple effect distillation, in which steam is initially supplied to the evaporator A1 through a Thermo-Vapor Compressor (TVC) and vapor produced by exchange latent heat with seawater that is supplied and sprayed to each evaporator 130 is sequentially supplied up to the evaporator AN as a heat source of the following evaporators 130 and supplies the high-pressure vapor to the reaction units 200 described above through a high-pressure vapor line 111, in which remaining high-pressure vapor may be returned to the TVC.

The second evaporation unit 120 produces final low-pressure vapor using multiple effect distillation, in which steam is initially supplied to the evaporator B1 through a TVC and vapor produced by exchange latent heat with seawater that is supplied and sprayed to each evaporator 130 is sequentially supplied up to the evaporator BN as a heat source of the following evaporators 130 and supplies the low-pressure vapor to the reaction units 200 described above through a low-pressure vapor line 121, in which remaining high-pressure vapor may be returned to the TVC.

The evaporators 130 each may include: a heat dissipation pipe 132 that accommodates vapor; a spray nozzle 133 that sprays seawater to the surface of the heat dissipation pipe 132; a demister 134 that is disposed over the spray nozzle 133 and separates water drops from vapor that is produced through latent heat evaporation by coming in contact with the surface of the heat dissipation pipe 132; and a housing 131 that accommodates seawater to be sprayed to the spray nozzle 133, including the spray nozzle 133, the heat dissipation pipe 132, and the demister 134.

It is possible to produce freshwater by collecting condensate water, which is produced in the heat dissipation pipe 132 through latent heat exchange due to contact of seawater with the surface of the heat dissipation pipe 132, sequentially from the evaporator A1 to evaporator BN.

Hereafter, the reaction 200 and the condenser 300 of the present disclosure are described in more detail.

Referring to FIGS. 5 to 10, the reaction unit 200 may be composed of a bed A 200a, a bed B 200b, and a bed C 200c each including an adsorbent (220 in FIGS. 5 to 10) that adsorbs or desorbs high-pressure vapor or low-pressure vapor produced by the multi-effect evaporator apparatus 100 and a heat exchange tube (210 in FIGS. 5 to 10) that removes heat, which is generated when the adsorbent 220 adsorbs moisture in the reaction unit 200, and through which cold water or hot water flows so that heat can be supplied to the reaction unit 200 in desorption. The number of the beds is an example and is not necessarily limited to three, and, four or more beds may be provided, depending on embodiments.

In an embodiment, the reaction unit 200 may be divided into the bed A 200a, the bed B 200b, and the bed C 200c. By controlling opening/closing of valves through a valve controller, high-pressure vapor and low-pressure vapor produced by the multi-effect evaporator apparatus 100 and chilled water and hot water that are supplied through cold-hot water lines 400 can be selectively supplied to the beds 200a, 200b, and 200c, and processes of low-temperature adsorption, high-temperature adsorption, pre-heating, desorption, and pre-cooling can be organically performed.

The valve controller (not shown) can control operation (opening and closing) of valves disposed vapor lines connecting the multi-effect evaporator apparatus 100 and the reaction units 200 to each other and connecting the reaction units 200 and the condenser 300 to each other, and valves for selectively supplying chilled water and hot water that is supplied from the cold-hot water lines 400 to the heat exchange tubes 210 of the reaction unit 200.

The condenser 300 receives and condenses vapor desorbed from the adsorbents 220 of the reaction units 200, and the condensate water may be collected as freshwater and stored in a freshwater storage tank 310 or may be used as industrial water or daily life water.

Discharge lines 230 may be connected to supply vapor discharged from the reaction units 200 to the condenser 300.

The cold-hot water lines 400 enables chilled water and hot water to be selectively supplied to the heat exchange tubes 210 of the reaction unit 200.

The high-pressure vapor line 111 of the first evaporation unit 110 and the low-pressure vapor line 121 of the second evaporation unit 120 may be connected to each reaction unit 200 through a final input pipe 140.

The adsorption desalination system using multi-effect evaporator apparatus according to an embodiment of the present disclosure can convert seawater into freshwater through six detailed processes. The detailed processes are described hereafter in more detail with reference to the drawings.

Referring to FIG. 4, adsorption desalination using a multi-effect evaporator apparatus according to an embodiment of the present disclosure may be composed of detailed processes of cycle #1, switch #1, cycle #2, switch #2, cycle #3, and switch #3. The adsorption desalination system using a multi-effect evaporator apparatus according to an embodiment of the present disclosure can convert seawater into freshwater by repeatedly performing the six detailed processes.

FIG. 4 shows the processes that are performed by the bed A, bed B, and bed C and opening and closing states of valves in the detailed processes. As described above, valves can be controlled and opened or closed such that the bed A to bed C perform any one of a high-pressure adsorption process, a low-pressure adsorption, a desorption process, a preheating process, and a precooling process in each of the detailed processes.

Figure 11:
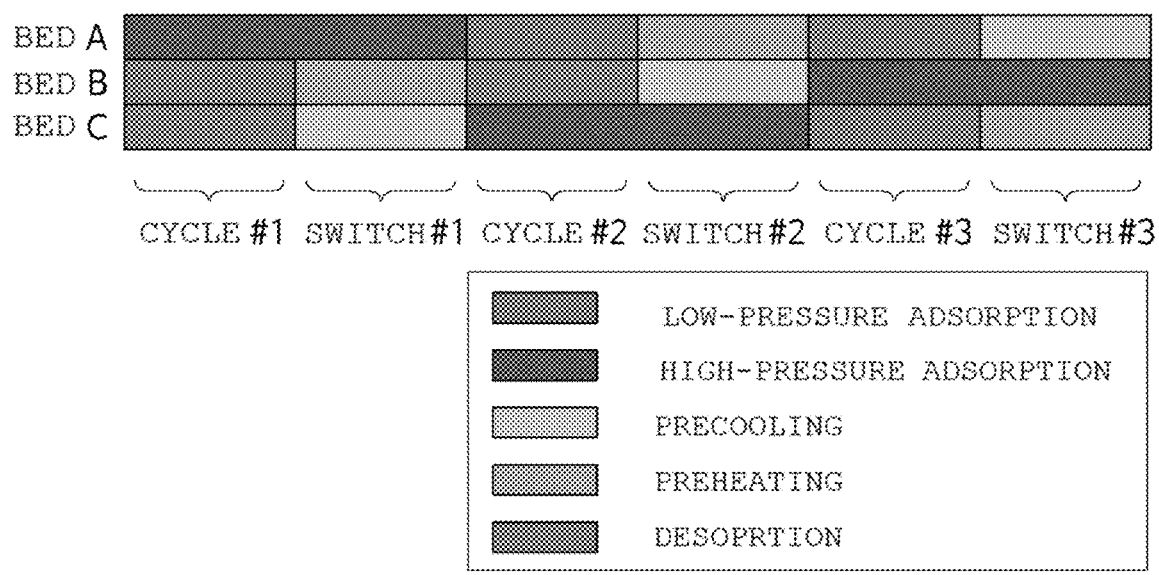
FIG. 11 is a table showing the operation order of a bed A, a bed B, and a bed C through an operation logic that is applied to the adsorption desalination system using a multi-effect evaporator apparatus according to the present disclosure.

For example, the bed A may perform a low-pressure adsorption process, the bed B may perform a high-pressure adsorption process, and the bed C may perform a desorption process in cycle #1; the bed A may perform a low-pressure adsorption process, the bed B may perform a preheating process, and the bed C may perform a precooling process in switch #1; the bed A may perform a high-pressure adsorption process, the bed B may perform a desorption process, and the bed C may perform a low-pressure adsorption process in cycle #2; the bed A may perform a preheating process, the bed B may perform a precooling process, and the bed C may perform a low-pressure adsorption process in switch #2; the bed A may perform a desorption process, the bed B may perform low-pressure adsorption process, and the bed C may perform a high-pressure adsorption process in cycle #3; and the bed A may perform a precooling process, the bed B may perform low-pressure adsorption process, and the bed C may perform a preheating process in switch #3. As shown in FIG. 11, the detailed processes of cycle #1-switch #1-cycle #2-switch #2-cycle #3-switch #3 may be sequentially repeated.

Hereafter, the detailed processes are described in more detail with reference to FIGS. 5 to 10.

Figure 5:
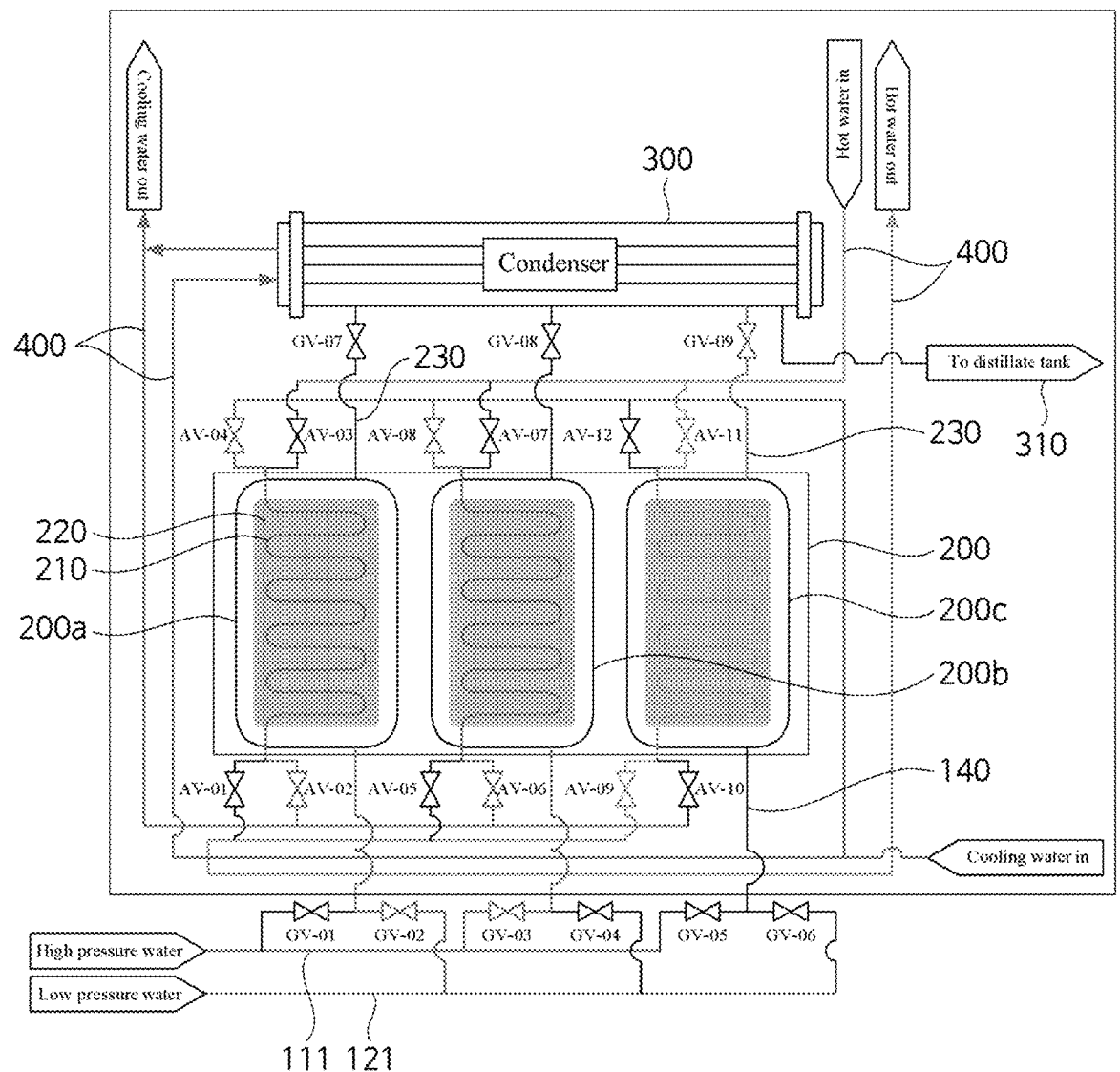
FIGS. 5 to 10 are views showing states of the detailed processes of the adsorption desalination system using a multi-effect evaporator apparatus according to the present disclosure.

FIG. 5 is a view showing an operation state in cycle #1.

Referring to FIG. 5, a) in the bed A 200a, a low-pressure adsorption process is performed, in which a valve GV-01 of the high-pressure vapor line 111 connected to the first reaction unit 110 is closed, a valve GV-02 of the low-pressure vapor line 112 connected to the second evaporation unit 120 is opened, and a valve GV-07 of the discharge line 230 connected to the condenser 300 is closed by the valve controller so that low-pressure vapor is collected, and a valve AV-02 and a valve AV-04 of the cold-hot water lines

400 are opened and a valve AV-01 and a valve AV-03 are closed by the valve controller so that chilled water is supplied to the heat exchanger tube 210 and moisture contained in the low-pressure vapor is adsorbed to the adsorbent 220.

In the bed B 200*b*, a high-pressure adsorption process is performed, in which a valve GV-03 of the high-pressure vapor line 111 connected to the first reaction unit 110 is opened, a valve GV-04 of the low-pressure vapor line 112 connected to the second evaporation unit 120 is closed, and a valve GV-08 of the discharge line 230 connected to the condenser 300 is closed by the valve controller so that high-pressure vapor is collected, and a valve AV-06 and a valve AV-08 of the cold-hot water lines 400 are opened and a valve AV-05 and a valve AV-07 are closed by the valve controller so that chilled water is supplied to the heat exchanger tube 210 and moisture contained in the high-pressure vapor is adsorbed to the adsorbent 220. In this case, it is possible to reduce or remove heat that is generated when chilled water is supplied to the bed A 200*a* and the bed B 200*b* and moisture is adsorbed to the adsorbents 220, using chilled water.

In the bed C 200*c*, a valve GV-05 of the high-pressure vapor line 111 connected to the first reaction unit 110 and a valve GV-06 of the low-pressure vapor line 121 are closed, a valve GV-09 of the discharge line 230 connected to the condenser 300 is opened, a valve AV-09 and a valve AV-11 of the cold-hot water lines 400, and a valve AV-10 and a valve AV-12 are closed by the valve controller. A desorption process of desorbing moisture from the absorbent 220 by supplying hot water to the heat exchange tube 210 and of supplying vapor to the condenser 300 through the discharge line 230 connected to the condenser 300 by opening and closing the valves is performed.

Figure 6:
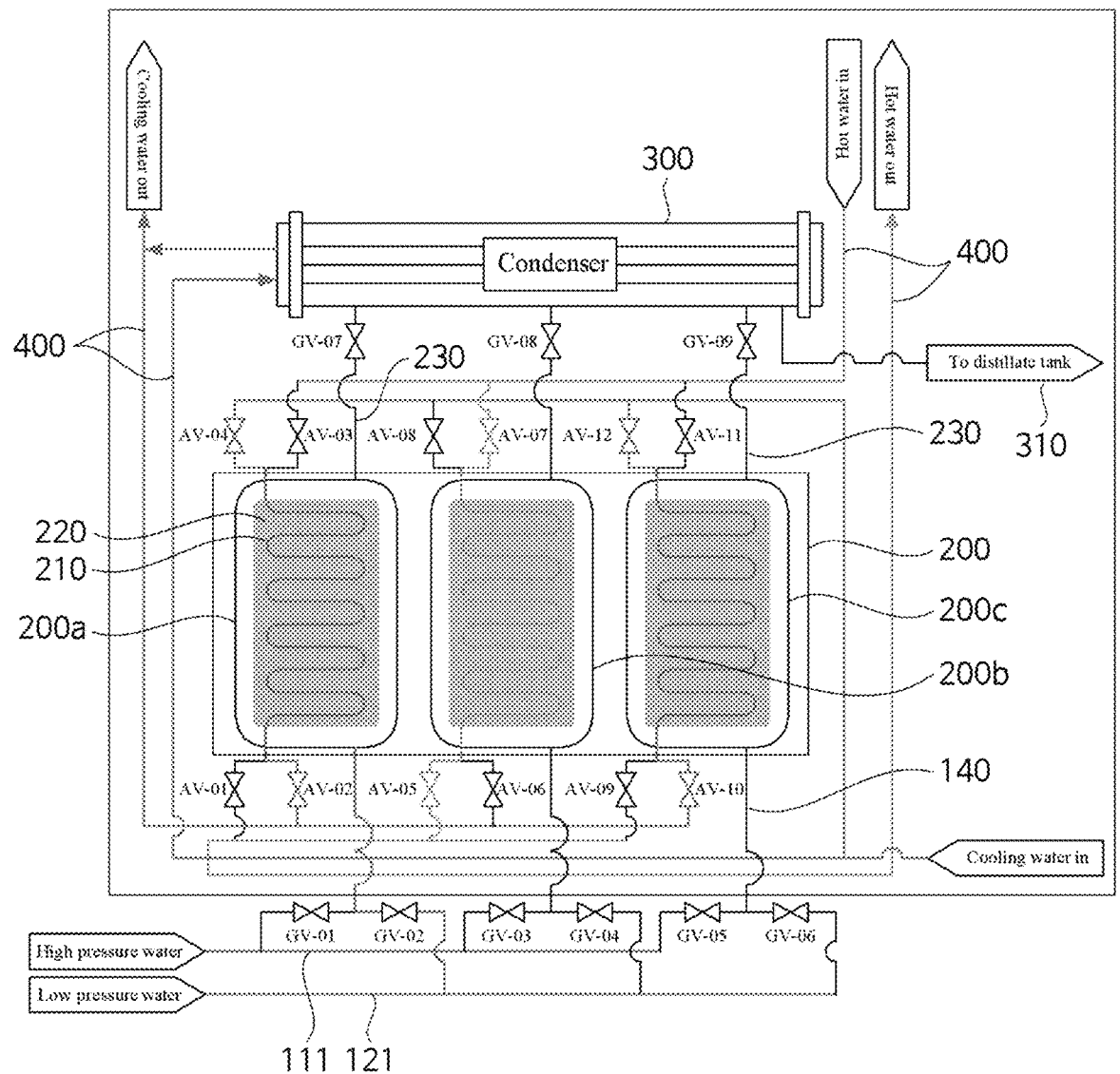

FIG. 6 is a view showing an operation state in switch #1.

Referring to FIG. 6, b) in the bed A 200*a*, a low-pressure adsorption process is performed, in which the valve GV-01 of the high-pressure vapor line 111 connected to the first reaction unit 110 is closed, the valve GV-02 of the low-pressure vapor line 112 connected to the second evaporation unit 120 is opened, and the valve GV-07 of the discharge line 230 connected to the condenser 300 is closed by the valve controller so that low-pressure vapor is collected, and the valve AV-02 and the valve AV-04 of the cold-hot water lines 400 are opened and the valve AV-01 and the valve AV-03 are closed by the valve controller so that chilled water is supplied to the heat exchanger tube 210 and moisture contained in the low-pressure vapor is adsorbed to the adsorbent 220.

In the bed B 200*b*, a preheating process is performed, in which the valve GV-03 of the high-pressure vapor line 111 connected to the first reaction unit 110, the valve GV-04 of the low-pressure vapor line 121 connected to the second reaction unit 120, and the valve GV-08 of the discharge line 230 are all closed, the valve AV-05 and the valve AV-07 of the cold-hot water lines 400 are opened, and the valve AV-06 and the valve AV-08 are closed by the valve controller so that hot water is supplied to the heat exchanger 210 for preheating.

Figure 7:
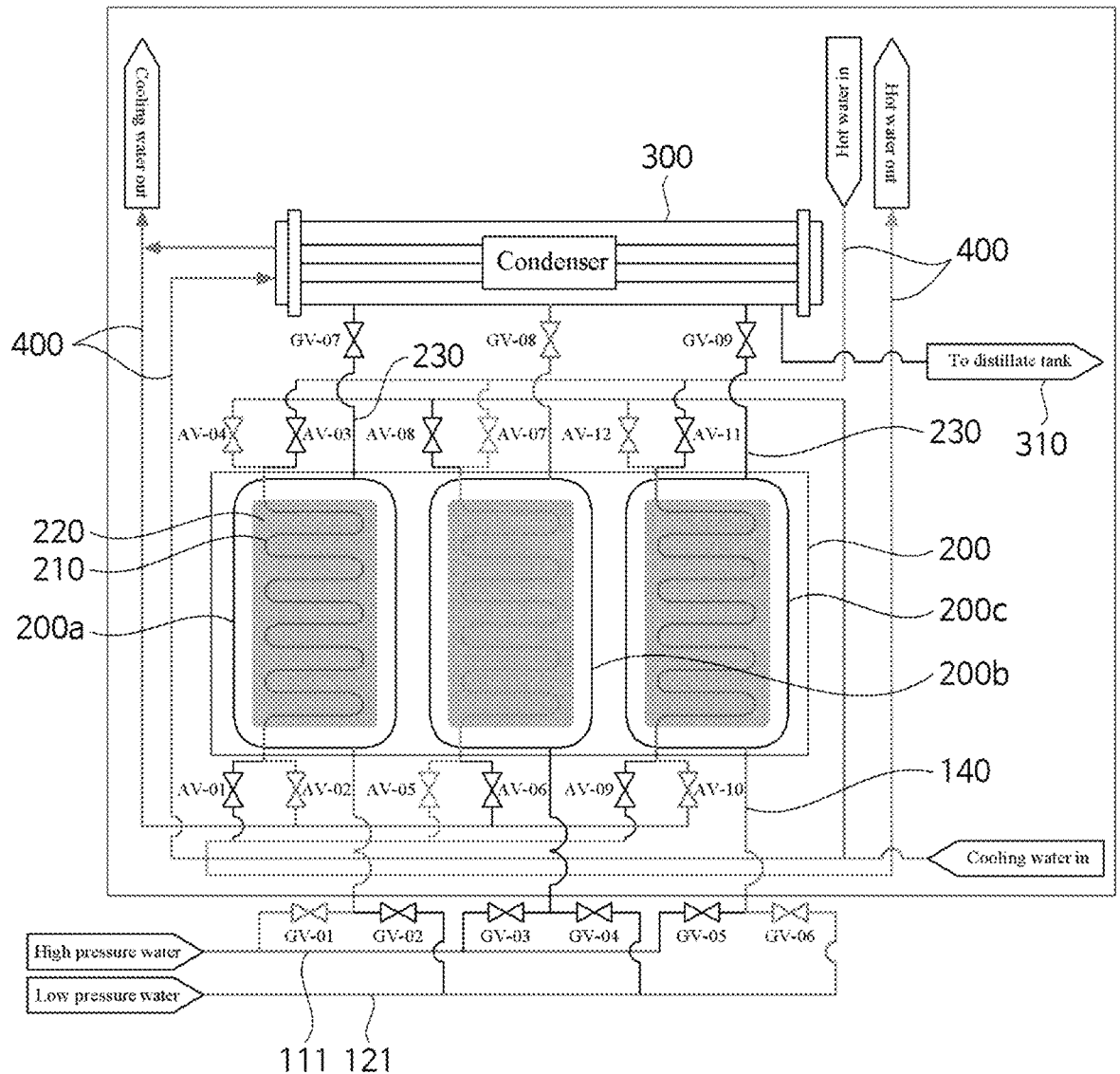

In the bed C 200*c*, a precooling process is performed, in which the valve GV-05 of the high-pressure vapor line 111 connected to the first reaction unit 110, the valve GV-06 of the low-pressure vapor line 121 connected to the second reaction unit 120, and the valve GV-09 of the discharge line 230 are all closed, the valve AV-10 and the valve AV-12 of the cold-hot water lines 400 are opened, and the valve AV-09 and the valve AV-11 are closed by the valve controller so that chilled water is supplied to the heat exchanger 210 for precooling FIG. 7 is a view showing an operation state in cycle #2.

Referring to FIG. 7, c) in the bed C 200*c*, a high-pressure adsorption process is performed, in which the valve GV-01 of the high-pressure vapor line 111 connected to the first reaction unit 110 is opened, the valve GV-02 of the low-pressure vapor line 112 connected to the second evaporation unit 120 is closed, and the valve GV-07 of the discharge line 230 connected to the condenser 300 is closed by the valve controller so that high-pressure vapor is collected, and the valve AV-02 and the valve AV-04 of the cold-hot water lines 400 are opened and the valve AV-01 and the valve AV-03 are closed by the valve controller so that chilled water is supplied to the heat exchanger tube 210 and moisture contained in the high-pressure vapor is adsorbed to the adsorbent 220.

In the bed B 200*b*, a desorption process is performed, in which the valve GV-03 of the high-pressure vapor line 111 connected to the first reaction unit 110 and the valve GV-04 of the low-pressure vapor line 112 connected to the second evaporation unit 120 are closed, the valve GV-08 of the discharge line 230 connected to the condenser 300 is opened, the valve AV-05 and the valve AV-07 of the cold-hot water lines 400 are opened, and the valve AV-06 and the valve AV-08 are closed by the valve controller so that hot water is supplied to the heat exchanger tube 210 and moisture adsorbed to the adsorbent 220 is desorbed, whereby vapor is supplied to the condenser 300 through the discharge line 230 connected to the condenser 300.

In the bed C 200*c*, a low-pressure adsorption process is performed, in which the valve GV-05 of the high-pressure vapor line 111 connected to the first reaction unit 110 is closed, the valve GV-06 of the low-pressure vapor line 112 connected to the second evaporation unit 120 is opened, and the valve GV-09 of the discharge line 230 connected to the condenser 300 is closed by the valve controller so that low-pressure vapor is collected, and the valve AV-10 and the valve AV-12 of the cold-hot water lines 400 are opened and the valve AV-09 and the valve AV-11 are closed by the valve controller so that chilled air is supplied to the heat exchanger tube 210 and moisture contained in the low-pressure vapor is adsorbed to the adsorbent 220.

Figure 8:
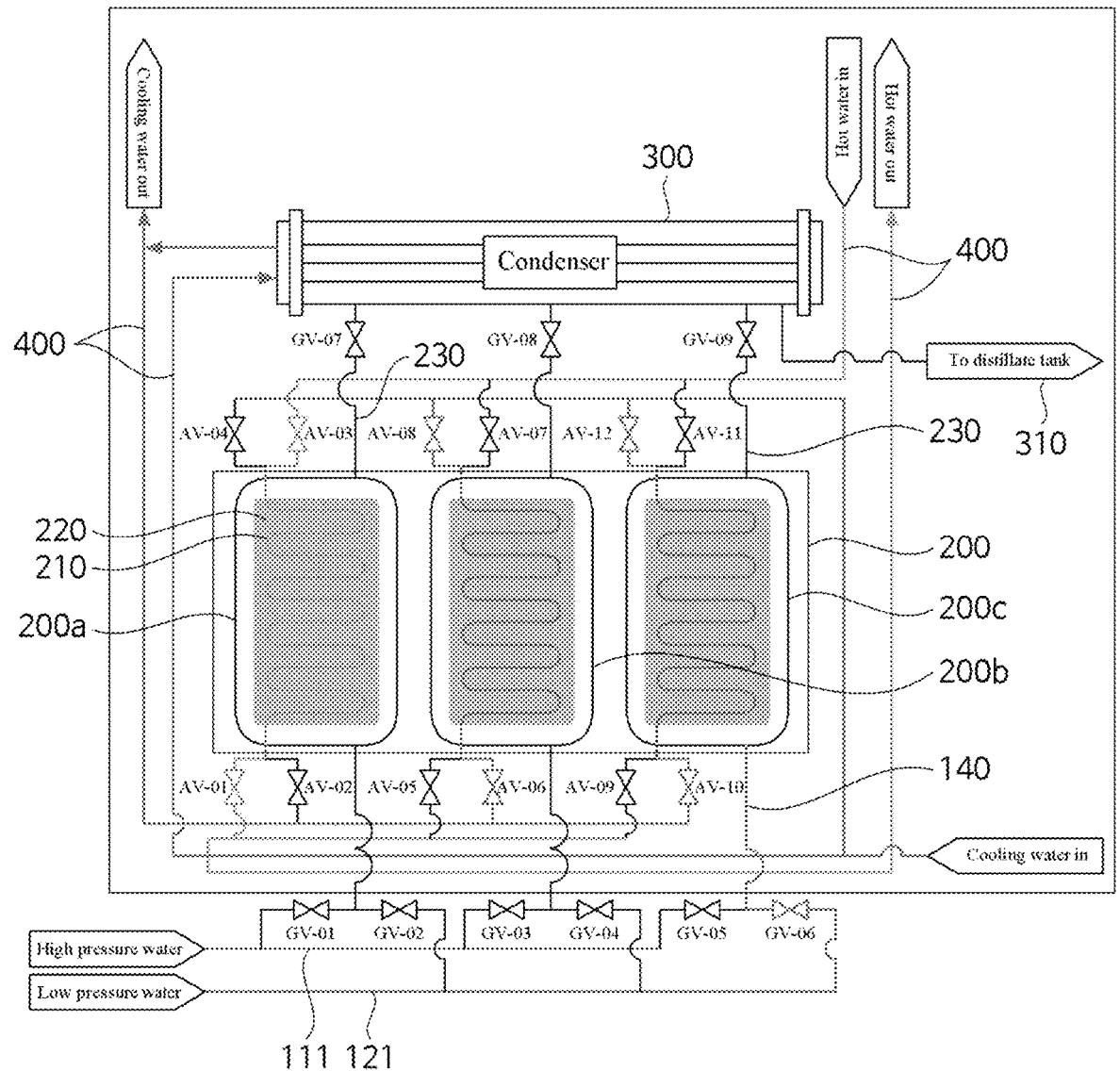

FIG. 8 is a view showing an operation state in switch #2.

Referring to FIG. 8, d) in the bed A 200*a*, a preheating process is performed, in which the valve GV-01 of the high-pressure vapor line 111 connected to the first reaction unit 110, the valve GV-02 of the low-pressure vapor line 121 connected to the second reaction unit 120, and the valve GV-07 of the discharge line 230 are all closed, the valve AV-01 and the valve AV-03 of the cold-hot water lines 400 are opened, and the valve AV-02 and the valve AV-04 are closed by the valve controller so that hot water is supplied to the heat exchanger 210 for preheating.

In the bed B 200*b*, a precooling process is performed, in which the valve GV-03 of the high-pressure vapor line 111 connected to the first reaction unit 110, the valve GV-04 of the low-pressure vapor line 121 connected to the second reaction unit 120, and the valve GV-08 of the discharge line 230 are all closed, the valve AV-06 and the valve AV-06 of the cold-hot water lines 400 are opened, and the valve AV-05 and the valve AV-07 are closed by the valve controller so that chilled water is supplied to the heat exchanger 210 for precooling.

In the bed C 200*c*, a low-pressure adsorption process is performed, in which the valve GV-05 of the high-pressure vapor line 111 connected to the first reaction unit 110 is closed, the valve GV-06 of the low-pressure vapor line 112 connected to the second evaporation unit 120 is opened, and the valve GV-09 of the discharge line 230 connected to the condenser 300 is closed by the valve controller so that low-pressure vapor is collected, and the valve AV-10 and the valve AV-12 of the cold-hot water lines 400 are opened and the valve AV-09 and the valve AV-11 are closed by the valve controller so that chilled air is supplied to the heat exchanger tube 210 and moisture contained in the low-pressure vapor is adsorbed to the adsorbent 220.

Figure 9:
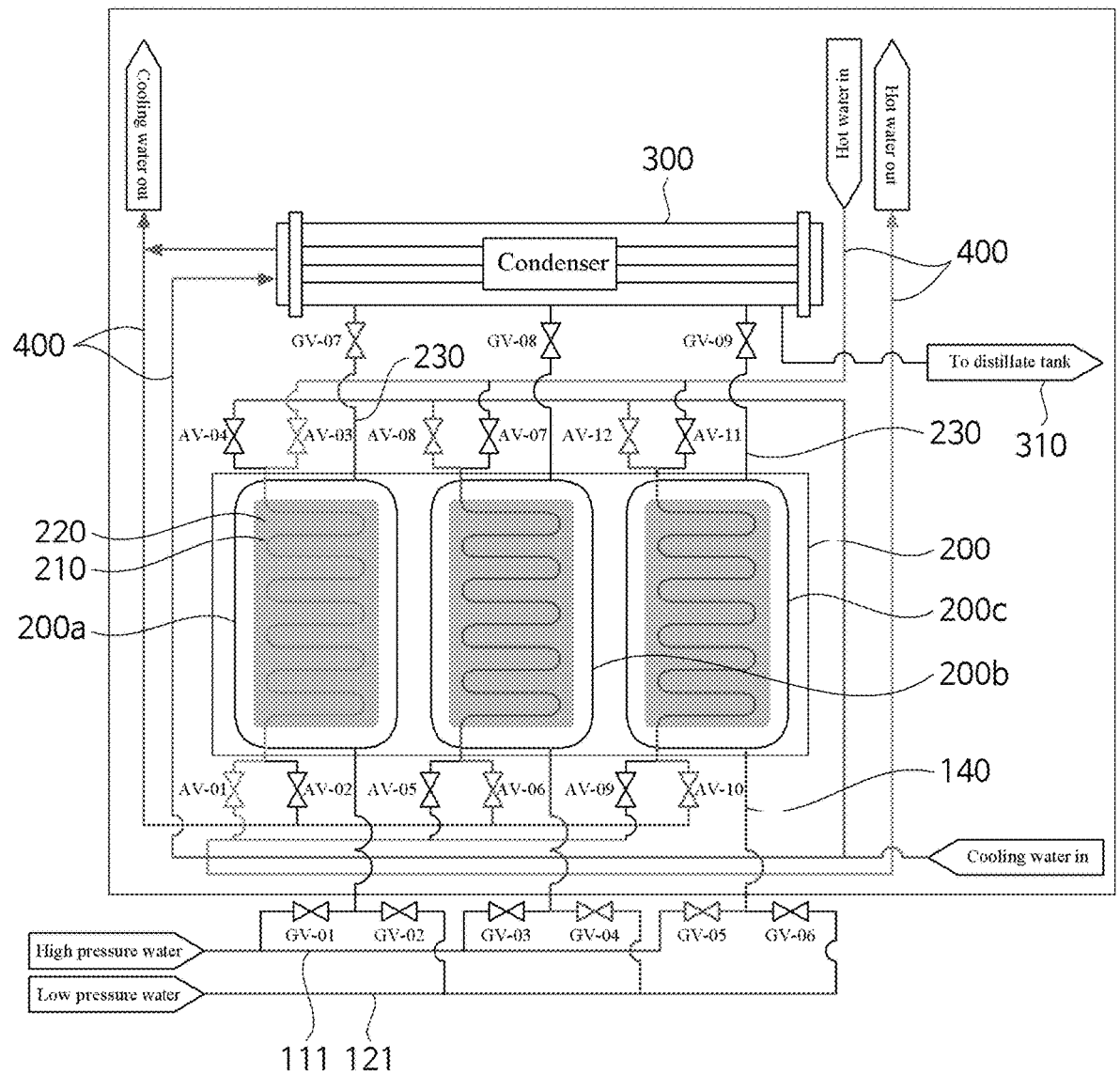

FIG. 9 is a view showing an operation state in cycle #3.

Referring to FIG. 9, in the bed A 200a, a desorption process is performed, in which the valve GV-01 of the high-pressure vapor line 111 connected to the first reaction unit 110 and the valve GV-02 of the low-pressure vapor line 112 connected to the second evaporation unit 120 are closed, the valve GV-07 of the discharge line 230 connected to the condenser 300 is opened, the valve AV-01 and the valve AV-03 of the cold-hot water lines 400 are opened, and the valve AV-02 and the valve AV-04 are closed by the valve controller so that hot water is supplied to the heat exchanger tube 210 and moisture adsorbed to the adsorbent 220 is desorbed, whereby vapor is supplied to the condenser 300 through the discharge line 230 connected to the condenser 300.

In the bed B 200b, a low-pressure adsorption process is performed, in which the valve GV-03 of the high-pressure vapor line 111 connected to the first reaction unit 110 is closed, the valve GV-04 of the low-pressure vapor line 112 connected to the second evaporation unit 120 is opened, and the valve GV-08 of the discharge line 230 connected to the condenser 300 is closed by the valve controller so that low-pressure vapor is collected, and the valve AV-06 and the valve AV-08 of the cold-hot water lines 400 are opened and the valve AV-05 and the valve AV-07 are closed by the valve controller so that chilled air is supplied to the heat exchanger tube 210 and moisture contained in the low-pressure vapor is adsorbed to the adsorbent 220.

In the bed C 200c, a high-pressure adsorption process is performed, in which the valve GV-05 of the high-pressure vapor line 111 connected to the first reaction unit 110 is opened, the valve GV-06 of the low-pressure vapor line 112 connected to the second evaporation unit 120 is closed, and the valve GV-09 of the discharge line 230 connected to the condenser 300 is closed by the valve controller so that high-pressure vapor is collected, and the valve AV-10 and the valve AV-12 of the cold-hot water lines 400 are opened and the valve AV-09 and the valve AV-11 are closed by the valve controller so that chilled water is supplied to the heat exchanger tube 210 and moisture contained in the high-pressure vapor is adsorbed to the adsorbent 220.

Figure 10:
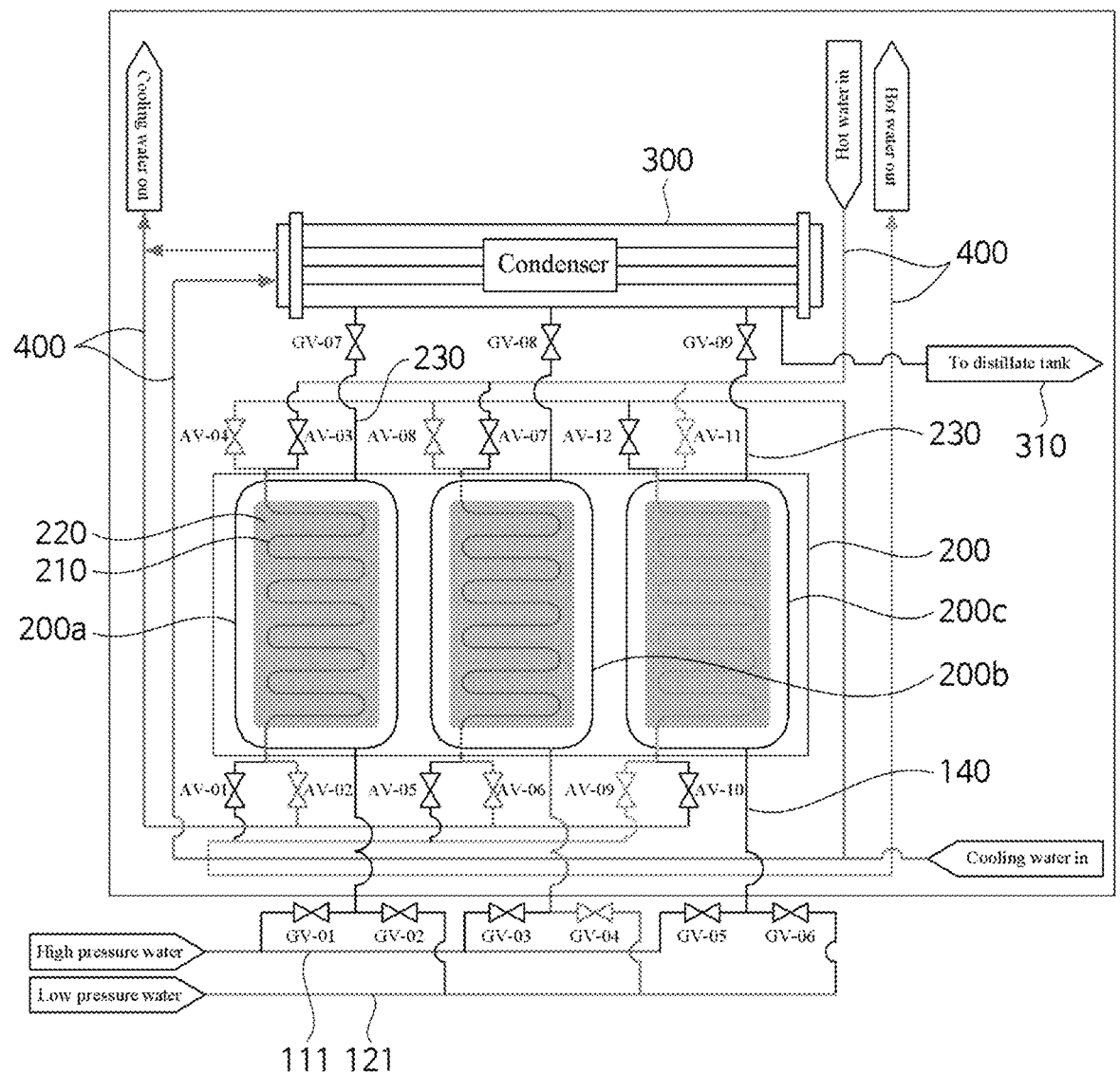

FIG. 10 is a view showing an operation state in switch #3.

Referring to FIG. 10, f) in the bed A 200a, a precooling process is performed, in which the valve GV-01 of the high-pressure vapor line 111 connected to the first reaction unit 110, the valve GV-02 of the low-pressure vapor line 121 connected to the second reaction unit 120, and the valve GV-07 of the discharge line 230 are all closed, the valve AV-02 and the valve AV-04 of the cold-hot water lines 400 are opened, and the valve AV-01 and the valve AV-02 are closed so that chilled water is supplied to the heat exchanger 210 for precooling.

In the bed B 200b, a low-pressure adsorption process is performed, in which the valve GV-03 of the high-pressure vapor line 111 connected to the first reaction unit 110 is closed, the valve GV-04 of the low-pressure vapor line 112 connected to the second evaporation unit 120 is opened, and the valve GV-08 of the discharge line 230 connected to the condenser 300 is closed by the valve controller so that low-pressure vapor is collected, and the valve AV-06 and the valve AV-08 of the cold-hot water lines 400 are opened and the valve AV-05 and the valve AV-07 are closed by the valve controller so that chilled air is supplied to the heat exchanger tube 210 and moisture contained in the low-pressure vapor is adsorbed to the adsorbent 220.

In the bed C 200c, a preheating process is performed, in which the valve GV-05 of the high-pressure vapor line 111 connected to the first reaction unit 110, the valve GV-06 of the low-pressure vapor line 121 connected to the second reaction unit 120, and the valve GV-09 of the discharge line 230 are all closed, the valve AV-09 and the valve AV-11 of the cold-hot water lines 400 are opened, and the valve AV-10 and the valve AV-12 are closed by the valve controller so that hot water is supplied to the heat exchanger 210 for preheating In an embodiment of the present disclosure, cycle #1, switch #1, cycle #2, switch #2, cycle #3, and switch #3 described above can be sequentially repeatedly performed.

In the desalination process described above, it is possible to prevent moisture in the condenser 300 from moving to the reaction unit 200, adjust pressure, and save energy through the preheating and precooling processes.

Hereafter, technical effects of the adsorption desalination system using a multi-effect evaporator apparatus according to the present disclosure are described.

AD systems in the related art are relatively inefficiency in terms of COP and footprint in comparison to an existing vapor compression or absorption type cycle. This is because relatively high adsorption heat and slightly low equilibrium uptake of an adsorbent that considerably depend on the coverage of an absorbent (actual update to maximum uptake of an adsorbent to an adsorbate) in the AD system cycle of the related art.

Uptake capacity of an adsorbent to a specific adsorbate can be obtained from an adsorption isotherm showing uptake in an infinitely long equilibrium state.

Most existing AD systems use a (half) cycle time within 180 to 900 seconds, depending on the temperature of a heat source, and the cycle time for specific adsorbents is effectively limited to perform the adsorption and desorption processes in the AD cycle.

The COP of an AD system is defined as the ratio of latent heat to desorption heat of an adsorbate.

Adsorption heat is very higher than latent heat in most pairs of an adsorbent and an adsorbate under a condition of low relative pressure or low equilibrium uptake. Accordingly, a method of improving the ratio of a volume or footprint to capacity of AD systems in the related art is to apply a cycle having improved net uptake capacity.

High uptake of an adsorbent causes low adsorption heat close to the latent heat of an adsorbate at a high coverage. Most AD systems in the related art are operated in an operation condition of about a 02 coverage, so the COP of the AD systems in the related art can be improved over 015 from the existing level by increasing the net uptake capacity.

Further, as can be seen from analysis of second law of thermodynamics on AD systems in the related art, a regeneration or desorption process in which heat transfers at high temperature having higher kinetics is more efficient than an adsorption process.

However, in most AD systems of the related art, the same cycle time is applied to adsorption/desorption processes, and accordingly, additionally heating a desorption bed for a complete adsorption process causes deterioration of the efficiency of the AD systems.

Figure 12:
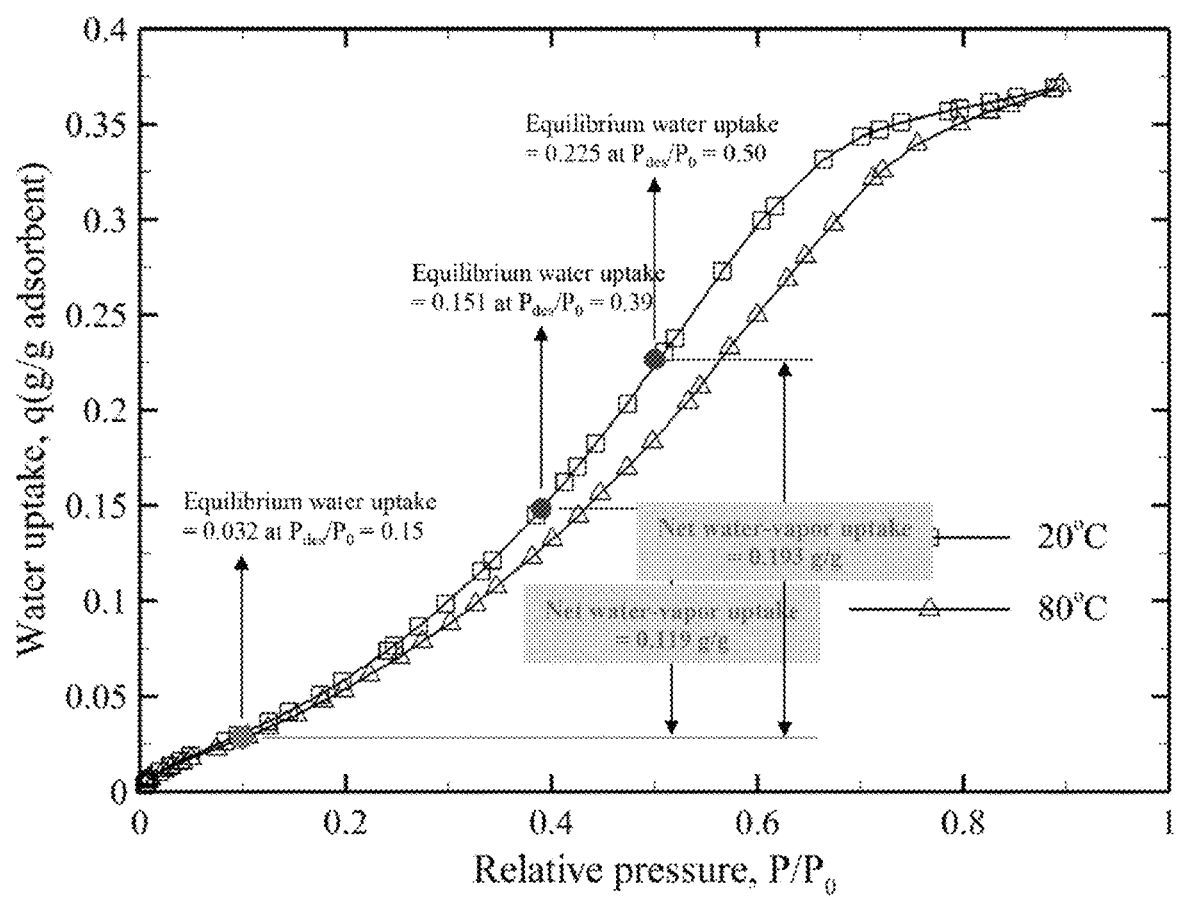
FIG. 12 is a graph showing the performance of the adsorption desalination system using a using multi-effect evaporator apparatus according to the present disclosure.

FIG. 12 is a graph showing the performance of the adsorption desalination system using a using multi-effect evaporator apparatus according to the present disclosure.

As shown in FIG. 12, it is possible to expect an effect that a coverage is increased an increase in pressure according to temperature through high-pressure vapor and low-pressure vapor that are provided by the first evaporation unit 110 and the second evaporation unit 120 proposed in the present disclosure.

Accordingly, when different cycle times are applied to adsorption and desorption processes, that is a relatively short cycle time is applied to a desorption process, the efficiency of AD systems in the related art can be improved.

By providing the present disclosure having the configuration described above, there is an effect that it is possible to supplement a COP and maximize the yield of freshwater, it is possible to use cold water, which is produced through the first evaporation unit and the second evaporation unit as a by-product, as water for district cooling and residential cooling, and it is possible to use condensate water, which is produced by latent heat exchange between seawater and vapor through multiple effect distillation, as freshwater.

The present disclosure relates to an adsorption desalination system using a multi-effect evaporator apparatus. The adsorption desalination system includes: a multi-effect evaporator apparatus 100 that produces high-pressure vapor and low-pressure vapor; a plurality of reaction units including an adsorbent 220 that adsorbs or desorbs moisture from the high-pressure vapor and low-pressure vapor produced by the multi-effect evaporator apparatus 100, and a heat exchange tube 210 that can transfer heat to the adsorbent through chilled water or hot water; a condenser 300 that condenses the vapor containing moisture desorbed from the adsorbents 220 of the reaction units 200 so that the vapor can be collected as freshwater; Cold-hot water lines 400 that selectively supply chilled water and hot water to the heat exchange tubes 210 of the reaction units 200; vapor lines connecting the multi-effect evaporator apparatus 100 and the reaction units 200 to each other and the reaction units 200 and the condenser 300 to each other, respectively; valves that are disposed in the vapor lines; and a valve controller that controls operation of the valves to selectively supply chilled water or hot water that is supplied to the heat exchange tubes 210 from the cold-hot water lines 400. Accordingly, it is possible to maximize the yield of freshwater from sea water and produce chilled water for district and residential cooling as a by-product, so the preset disclosure has industrial applicability in the desalination field.

What is claimed is:

1. An adsorption desalination system using a multi-effect evaporator apparatus, the adsorption desalination system comprising:
    a multi-effect evaporator apparatus configured to produce high-pressure vapor and low-pressure vapor;
    a plurality of reaction units, each reaction unit including:
        an adsorbent configured to adsorb or desorb moisture from the high-pressure vapor and the low-pressure vapor, and
        a heat exchange tube configured to transfer heat to the adsorbent through chilled water or hot water;
    a condenser configured to condense vapor containing moisture desorbed from the adsorbents of the plurality of reaction units so that the vapor can be collected as freshwater;
    cold-hot water lines configured to selectively supply the chilled water and the hot water to the heat exchange tubes of the plurality of reaction units;
    vapor lines configured to connect the multi-effect evaporator apparatus and the plurality of reaction units to each other and the plurality of reaction units and the condenser to each other, respectively;
    valves disposed in the vapor lines; and
    a valve controller configured to control operation of the valves to selectively supply the chilled water or the hot water that is supplied to the heat exchange tubes from the cold-hot water lines,
    wherein the plurality of reaction units comprise a bed A, a bed B, and a bed C each including the adsorbent and the heat exchange tube,
    wherein the valve controller is configured to control the bed A, the bed B, and the bed C so as to selectively supply, to the bed A, the bed B, or the bed C, the high-pressure vapor or the low-pressure vapor produced by the multi-effect evaporator apparatus, and the chilled water or the hot water through the cold-hot water lines,
    wherein the adsorption desalination comprises processes of cycle #1, switch #1, cycle #2, switch #2, cycle #3, and switch #3,
    wherein the valve controller is configured to control the bed A, the bed B, and the bed C such that:
        in cycle #1, the bed A performs a low-pressure adsorption process, the bed B performs a high-pressure adsorption process, and the bed C performs a desorption process,
        in switch #1, the bed A performs a low-pressure adsorption process, the bed B performs a preheating process, and the bed C performs a precooling process,
        in cycle #2, the bed A performs a high-pressure adsorption process, the bed B performs a desorption process, and the bed C performs a low-pressure adsorption process,
        in switch #2, the bed A performs a preheating process, the bed B performs a precooling process, and the bed C performs a low-pressure adsorption process,
        in cycle #3, the bed A performs a desorption process, the bed B performs a low-pressure adsorption process, and the bed C performs a high-pressure adsorption process,
        in switch #3, the bed A performs a precooling process, the bed B performs a low-pressure adsorption process, and the bed C performs a preheating process, and
    wherein the valve controller is configured to control the bed A, the bed B, and the bed C such that the processes of cycle #1, switch #1, cycle #2, switch #2, cycle #3, and switch #3 are sequentially performed in this order.

2. The adsorption desalination system of claim 1, wherein the multi-effect evaporator apparatus includes:
    a first evaporation unit including a plurality of sequential evaporators and a high-pressure evaporator configured to discharge the high-pressure vapor; and
    a second evaporation unit including a plurality of sequential evaporators and a low-temperature evaporator configured to discharge a final low-pressure vapor.

3. The adsorption desalination system of claim 2, wherein the first evaporation unit and the second evaporation unit are connected to each other, and wherein condensate water produced therein is configured to sequentially move to an evaporator of the first evaporation unit to the low-pressure evaporator of the second evaporation unit so as to produce freshwater.

4. The adsorption desalination system of claim 2, wherein each evaporator of the plurality of sequential evaporators in the first evaporation unit and the plurality of sequential evaporators in the second evaporation unit includes:
- a heat dissipation pipe configured to collect gas;
- a spray nozzle configured to spray seawater to a surface of the heat dissipation pipe;
- a demister disposed over the spray nozzle and configured to separate water drops from vapor produced by evaporation of seawater; and
- a housing configured to accommodate the spray nozzle, the heat dissipation pipe, and the demister.

* * * * *